(12) United States Patent
O'Hearn et al.

(10) Patent No.: US 6,402,833 B1
(45) Date of Patent: Jun. 11, 2002

(54) BINDER FOR MINE TAILINGS

(75) Inventors: Brian O'Hearn, Richmond Hill; Terrance Ronald Walton, Oakville, both of (CA)

(73) Assignee: Lafarge Canada Inc., Quebec (CA)

( * ) Notice: Subject to any disclaimer, the term of this patent is extended or adjusted under 35 U.S.C. 154(b) by 38 days.

(21) Appl. No.: 09/615,932

(22) Filed: Jul. 13, 2000

(51) Int. Cl.⁷ ................................................. C04B 18/12
(52) U.S. Cl. ........................ 106/790; 106/697; 106/714; 106/716; 106/789; 106/791; 106/792
(58) Field of Search ................................. 106/697, 714, 106/716, 789, 790, 791, 792

(56) References Cited

U.S. PATENT DOCUMENTS

| | | | |
|---|---|---|---|
| 4,451,295 A | | 5/1984 | Sprouse |
| 5,340,235 A | * | 8/1994 | Milliken .................... 106/710 |

FOREIGN PATENT DOCUMENTS

| | | |
|---|---|---|
| CA | 963482 | 2/1975 |
| CA | 1056409 | 12/1979 |
| CA | 1323185 | 10/1993 |
| CA | 2107006 | 3/1995 |
| CA | 2214142 | 9/1996 |

\* cited by examiner

*Primary Examiner*—Elizabeth D. Wood
(74) *Attorney, Agent, or Firm*—Bachman & LaPointe, P.C.

(57) ABSTRACT

A binder for mine tailings and aggregate used as a backfill for an underground void comprises ferrous slag, and cement kiln dust, optionally with lime kiln dust; the binder displays strength characteristics better than or comparable to those achieved with conventional binders based on Portland cement and slag.

19 Claims, No Drawings

BINDER FOR MINE TAILINGS

BACKGROUND OF THE INVENTION a) Field of the Invention

This invention relates to a fill material for an underground void; and to a method of backfilling an underground void.

b) Description of Prior Art

In mining, backfill is often necessary as part of a particular mining method for ground stability or as a platform to work from. Backfill generally consists of mine tailings, a waste product from mine beneficiation, natural sand, rock material or some other type of aggregate or some combination of any of these materials, referred to as aggregates. When consolidation is required the mine tailings and aggregates are mixed with a slurry comprising a binder and water. Common binders can consist of a combination of one or more of the following, a variety of Portland cement, ferrous and non-ferrous slag, flyash and lime. On some occasions flocculants, water reducers, accelerators, gelling agents, such as sodium silicate, or other specialty products are added to the backfill to: enhance flow, retard set-up of the binder, minimize the loss of fine particles, accelerate early strength and absorb water.

The mine tailings and aggregates are essentially inert to reaction with the binder and the water. In use the binder sets in the presence of the water to form a solid mass which binds the backfill.

In practice the fill material which comprises the backfill, binder and water is formed into an aqueous mobile slurry or paste which is pumped through pipes or otherwise introduced into the void. In place in the void the binder and water react, solidifying into a mass which binds the backfill. This solidification process may extend over several weeks.

The solidified material provides support in the void, for example, to maintain the integrity of adjacent tunnels employed to provide access to new mining areas. Typically the voids are underground sites from which metal ore has been mined and the mine tailings component of the backfill introduced into the void may be derived from the metal ore previously removed from the mining site which resulted in formation of the void.

The use of the backfill in this manner also provides a ready means of disposing of the waste mine tailings while maintaining the structural integrity of the mine substructure.

Portland cement is usually a significant component of binders commercially employed for backfill which includes mine tailings as described here, however, it would be advantageous to mining companies to utilize binders that outperform Portland cement.

SUMMARY OF THE INVENTION

It is an object of this invention to provide a binder composition for a backfill which can outperform Portland cement in many conditions.

It is a further object of this invention to provide such a binder composition based on what were previously considered waste by-products from industrial manufacturing rather than on mainstream manufactured products.

It is a further object of this invention to provide a method of backfilling an underground void.

In accordance with one aspect of the invention, there is provided a fill material for an underground void comprising an intimate mixture of: a particulate composition comprising mine tailings, a particulate, hydraulically solidifiable inorganic binder composition for said particulate composition and water, said binder composition comprising, in weight %, to a total of 100%, based on the weight of the binder composition: a) 70 to 97.5% of a ferrous slag; b) 2.5 to 30% of cement kiln dust, and c) 0 to 30% of lime kiln dust.

In another aspect of the invention there is provided a method of backfilling an underground void comprising: filling said void with a fill material of the invention, and hydraulically solidifying said binder composition and said water to form a solid mass binding said particulate composition.

In yet another aspect of the invention there is provided a particulate binder composition for a backfill material comprising, in weight %, to a total of 100%, based on the weight of the binder composition: a) 70 to 97.5% of a ferrous slag, b) 2.5 to 30% of cement kiln dust, and c) 0 to 30% of lime kiln dust.

DESCRIPTION OF PREFERRED EMBODIMENTS OF THE INVENTION i) Fill Material

The fill material of the invention comprises an intimate mixture of a particulate composition comprising mine tailings, a particulate hydraulically solidifiable inorganic binder composition for the particulate composition and water.

Suitably the fill material has a solids content of 65 to 85%, by weight, and the weight ratio of the binder composition to the particulate composition is 1:8 to 1:50, preferably 1:10 to 1:35, more preferably 1:15 to 1:30.

The fill material of the invention achieves good strength results in 3 days and demonstrates good strength results after 28 days and 90 days. In particular binder compositions of the invention comprising only iron blast furnace slag and cement kiln dust provided better strength results at 3 days, 7 days, 14 days and 28 days and better or comparable strengths at 90 days than corresponding binder compositions comprising only Portland cement and iron blast furnace slag.

Fill material of the invention additionally including the optional lime kiln dust in the binder composition, with the cement kiln dust and iron blast furnace slag achieved 28 day strengths higher than the corresponding fill materials in which the binder composition contained only the cement kiln dust and iron blast furnace slag.

The cement kiln dust is important in achieving high early (short term) strength, e.g., 3 day strength as compared to corresponding Portland cement/slag binder compositions, but also enhances the late (long term) strength, e.g., 28 day strength. The lime kiln dust, in the absence of the cement kiln dust, on the other hand functions to improve the late strength, e.g., 28 day strength, but does not appear to assist the early strength. Inclusion of both cement kiln dust and lime kiln dust improves both the early strength and the late strength.

a) Backfill

The particulate composition generally referred to as backfill may be composed completely of mine tailings or it may be composed of mine tailings and inert aggregate, for example, fine aggregate and coarse aggregate.

The nature of mine tailings depends on the mine from which the ore is derived and in general they are composed of different residual minerals separated from metal ore, in processing stages directed at beneficiation of the metal ore prior to the smelting or other metal recovery operation.

By way of example only mine tailings may typically comprise varying amounts of quartz, phlogopite, albite, tremolite, phyrrhotite, kaolinite and magnetite.

Mine tailings may typically have a median particulate size of 20 to 150 microns, and may include finely ground rock particles ranging in size from 10 microns to 425 microns.

The nature of the mine tailings is in no way critical to the invention.

20 microns for cement kiln dust and 100% passing 1,000 microns and 50% passing 100 microns for lime kiln dust.

Table 1 below, sets out typical chemical compositions of the binder components employed in the invention, namely, iron blast furnace slag, cement kiln dust and lime kiln dust.

TABLE I

| | Chemistry +/– Range | | | | | | | | | |
|---|---|---|---|---|---|---|---|---|---|---|
| Material | $SiO_2$ | $Al_2O_3$ | $Fe_2O_3$ | CaO | $SO_3$ | MgO | $Na_2O$ | $K_2O$ | $TiO_2$ | LOI[4] |
| IBFS[1] | 35.8 +/– 1.9 | 9.3 +/– 1.9 | 0.69 +/– .38 | 37.4 +/– 5.0 | 3.4 +/– 1.1 | 11.35 +/– 5.3 | 0.43 +/– 0.18 | 0.44 +/– 0.10 | 0.69 +/– .38 | |
| CKD[2] | 13.4 +/– 1.8 | 3.82 +/– 1.4 | 1.64 +/– 0.14 | 48.4 +/– 5.6 | 16.0 +/– 4.2 | 1.26 +/– 0.30 | 0.33 +/– 0.18 | 4.50 +/– 2.2 | 0.25 +/– 0.06 | 10.3 +/– 3.8 |
| LKD[3] | 8.24 +/– 3.6 | 4.49 +/– 1.8 | 0.84 +/– 0.30 | 55.2 +/– 7.8 | 4.6 +/– 1.9 | 1.63 +/– 0.50 | 0.21 +/– 0.10 | 1.33 +/– 0.88 | 0.22 +/– 0.10 | 22.4 +/– 3.3 |

IBFS[1] = Iron Blast Furnace Slag
CKD[2] = Cement Kiln Dust
LKD[3] = Lime Kiln Dust
LOI[4] = Loss on Ignition The aggregates which may be included in the backfill may typically include the same classes of fine aggregate and coarse aggregate routinely employed in concrete.

A typical fine aggregate is sand and other material of mineral composition having a particle size of 150 $\mu$m to 4.75 mm.

Coarse aggregate typically comprises rock of varying size, gravel, crushed stone and other material of mineral composition having a particle size of 2.3 mm to 15 cm, generally at least 4.75 mm and typically 1.5 cm to 4 cm.

b) Binder Composition

The binder composition of the invention comprises as its major component ferrous slag and cement kiln dust as its minor component with lime kiln dust being an optional secondary minor component.

The binder composition is free of Portland cement or similar manufactured hydraulic cements. The slag, cement kiln dust and optional lime kiln dust all are waste products formed in the manufacture of other products, for example, iron, in the case of iron blast furnace slag; cement in the case of cement kiln dust; and lime in the case of lime kiln dust.

The major slag component is employed in an amount of 70 to 97.5%, preferably 75 to 90%, by weight, of the binder composition; the cement kiln dust is employed in an amount of 2.5 to 30%, preferably 10 to 20%, by weight of the composition. The lime kiln dust is optional and thus the lower limit is 0%, but when present is preferably employed in an amount of at least 2.5%, by weight, generally 2.5 to 30%, preferably 10 to 20%, by weight, of the binder composition. The indicated percentages, by weight, are to a total of 100% of the binder composition.

1. Iron Blast Furnace Slag

The preferred iron blast furnace slag is a waste residue by-product in the production of iron from iron ore in a blast furnace. The molten slag is typically water-cooled and pelletized or granulated, whereafter it is ground, for example, in a ball mill, and sized to a fineness typically of 4,500 to 5,000 Blaine.

2. Cement Kiln Dust and Lime Kiln Dust

Cement kiln dust and lime kiln dust are produced in kilns as by-products in the manufacture of cement and lime, respectively They are composed of fine particles typically having a particle size of 100% passing 300 microns and 50% passing c) Water The water hydraulically reacts with the particulate binder composition to form a mass which slowly solidifies forming a hard mass in which the particulate backfill is bound.

The water is typically employed in the fill material to provide a solids content in the fill material of 65 to 85%, preferably 70 to 80%, and typically about 70% or about 80%, by weight.

EXAMPLES

The following Table of Examples, demonstrates the strength results achieved with fill material of the invention as compared with comparison fill materials, including fill materials in which the binder is based on Portland cement and slag and fill materials in which the binder is based on slag and lime kiln dust but no cement kiln dust.

A solids consistency of 70%, by weight, was employed throughout.

Examples 9, 10, 11, 12, 13, 14, 21 and 22 illustrate the invention employing a binder composition containing only cement kiln dust and slag. Examples 25, 26, 27, 28, 29, 30, 31 and 32 illustrate the invention employing a binder composition containing cement kiln dust, lime kiln dust and slag. The remaining Examples are for comparison. Thus Examples 9 and 10 of the invention compared with the conventional fill material of Examples 3 and 4 shows the improved results over the prior art.

In the Examples, the following notations are employed:

CKD=cement kiln dust

LKD=lime kiln dust

NPC=normal Portland cement

Slag=iron blast furnace slag

Tailings=mine tailings

Activator=the material of the binder other than the slag.

The Activator:Slag column identifies the weight ratio of binder materials other than slag to the slag. In Example 1 there is thus a lime:slag ratio of 10:90 and in Example 9 there is a CKD:slag ratio of 10:90, whereas in Example 27 there is a weight ratio of CKD to LKD to Slag of 5:5:90.

The Tailings:Binder column identifies the weight ratio of tailings to binder composition.

TABLE OF EXAMPLES

| Materials EX (70% P.D.) | Activator: Slag | Tailings: Binder | Strength Results [(p.s.i.).] | | | | |
|---|---|---|---|---|---|---|---|
| | | | Break 1 (3 Days) | Break 2 (7 Days) | Break 3 (14 Days) | Break 4 (28 Days) | Break 5 (90 Days) |
| 1 Lime + Slag + Tailings | 10:90 | 15:1 | 17 | 47 | | 97 | 135 |
| 2 Lime + Slag + Tailings | 10:90 | 30:1 | | | 51 | 62 | 82 |
| 3 NPC + Slag + Tailings | 10:90 | 15:1 | 43 | 76 | | 112 | 161 |
| 4 NPC + Slag + Tailings | 10:90 | 30:1 | | | 58 | 71 | 89 |
| 5 LKD + Slag + Tailings | 10:90 | 15:1 | | 36 | 123 | 202 | 288 |
| 6 LKD + Slag + Tailings | 10:90 | 30:1 | | | 61 | 118 | 144 |
| 7 LKD + Slag + Tailings | 20:80 | 15:1 | | 47 | 130 | 203 | 289 |
| 8 LKD + Slag + Tailings | 20:80 | 30:1 | | | 66 | 106 | 149 |
| 9 CKD + Slag + Tailings | 10:90 | 15:1 | 48 | 82 | | 122 | 157 |
| 10 CKD + Slag + Tailings | 10:90 | 30:1 | | | 66 | 84 | 106 |
| 11 CKD + Slag + Tailings | 20:80 | 15:1 | 37 | 82 | | 113 | 145 |
| 12 CKD + Slag + Tailings | 20:80 | 30:1 | | | 49 | 56 | 72 |
| 13 CKD + Slag + Tailings | 30:70 | 15:1 | 19 | 70 | | 123 | 152 |
| 14 CKD + Slag + Tailings | 30:70 | 30:1 | | | 57 | 68 | 83 |
| 15 NPC + Tailings | 100% | 10:1 | 117 | | | 178 | |
| 16 NPC + Tailings | 100% | 15:1 | 62 | | | 91 | |
| 17 NPC + Tailings | 100% | 30:1 | 17 | | | 23 | |
| 18 NPC + Slag + Tailings | 10:90 | 10:1 | 60 | | | 181 | |
| 19 NPC + Slag + Tailings | 10:90 | 15:1 | 41 | | | 95 | |
| 20 NPC + Slag + Tailings | 10:90 | 30:1 | 32 | | | 56 | |
| 21 CKD + Slag + Tailings | 10:90 | 15:1 | 51 | | | 106 | |
| 22 CKD + Slag + Tailings | 10:90 | 30:1 | 33 | | | 69 | |
| 23 LKD + Slag + Tailings | 10:90 | 15:1 | 35 | | | 183 | |
| 24 LKD + Slag + Tailings | 10:90 | 30:1 | soft | 13 | | 89 | |
| 25 CKD + LKD + Slag + Tailings | 7.5:2.5:90 | 15:1 | 56 | | | 118 | |
| 26 CKD + LKD + Slag + Tailings | 7.5:2.5:90 | 30:1 | 28 | | | 71 | |
| 27 CKD + LKD + Slag + Tailings | 5:5:90 | 15:1 | 57 | | | 137 | |
| 28 CKD + LKD + Slag + Tailings | 5:5:90 | 30:1 | 22 | | | 85 | |
| 29 CKD + LKD + Slag + Tailings | 2.5:7.5:90 | 15:1 | 46 | | | 135 | |
| 30 CKD + LKD + Slag + Tailings | 2.5:7.5:90 | 30:1 | 12 | | | 85 | |
| 31 CKD + LKD + Slag + Tailings | 10:10:80 | 15:1 | 39 | | | 85 | |
| 32 CKD + LKD + Slag + Tailings | 10:10:80 | 30:1 | 27 | | | 65 | |
| 33 NPC + Lime + Slag + Tailings | 32.9:1.3:65.8 | 10:1 | 55 | | | 256 | |
| 34 NPC + Lime + Slag + Tailings | 32.9:1.3:65.8 | 30:1 | 13 | | | 52 | |

It will understood that various modifications can be made in the composition of the invention as described, while employing the spirit of the invention, and such modifications are to be considered as being within the scope of the invention.

We claim:

1. A fill material for an underground void comprising an intimate mixture of:
   A particulate composition comprising mine tailings, a particulate, hydraulically solidifiable inorganic binder composition for said particulate composition and water,
   Said binder composition comprising, in weight %, to a total of 100%, based on the weight of the binder composition:
   a) 70 to 97.5% of a ferrous slag;
   b) 2.5 to 30% of cement kiln dust, and
   c) 0 to 30% of lime kiln dust.

2. A fill material according to claim 1, wherein said binder composition comprises at least 2.5% of said lime kiln dust.

3. A fill material according to claim 1, said mixture further comprising inert particulate aggregate.

4. A fill material according to claim 1, having a solids content of 65 to 85%, by weight.

5. A fill material according to claim 1, where a) is iron blast furnace slag.

6. A fill material according to claim 2, comprising said binder composition and mine tailings in a weight ratio of 1:8 to 1:50.

7. A fill material according to claim 3, comprising said binder composition, mine tailings and aggregate in a weight ratio of binder composition to mine tailings and aggregate of 1:8 to 1:50.

8. A fill material for backfilling a man-made underground void comprising an intimate mixture of:
   i) a particulate composition of mine tailings and inert particulate aggregate,
   ii) a particulate, hydraulically solidifiable inorganic binder composition, and
   iii) water,
   said binder composition comprising, in weight %, to a total of 100%, based on the weight of the binder composition:
   a) 70 to 97.5% of iron blast furnace slag;
   b) 2.5 to 30% of cement kiln dust;
   c) 0 to 30% of lime kiln dust, provided that when present, said lime kiln dust is present in an amount of at least 2.5%;

said fill material having a solids content of 65 to 85%, by weight, and said binder composition and particulate composition being present in a weight ratio of 1:8 to 1:50.

9. A fill material according to claim 8, wherein said weight ratio is 1:10 to 1:35.

10. A fill material according to claim 8, wherein said weight ratio is 1:15 to 1:30.

11. A fill material according to claim 10, wherein said solids content is 65 to 75%, by weight.

12. A fill material according to claim 11, wherein said inert particulate aggregate comprises coarse aggregate.

13. A method of backfilling an underground void comprising:

filling said void with a fill material as defined in claim 1, and hydraulically solidifying said binder composition and said water to form a solid mass hindering said particulate composition.

14. A particulate binder composition for a backfill material comprising, in weight %, to a total of 100%, based on the weight of the binder composition:

a) 70 to 97.5% of a ferrous slag;

b) 2.5 to 30% of cement kiln dust, and c) 0 to 30% of lime kiln dust.

15. A particulate binder according to claim 14, comprising lime kiln dust in an amount of at least 2.5%, by weight.

16. A particulate binder according to claim 14, wherein said slag a) is iron blast furnace slag.

17. A particulate binder according to claim 15, wherein said slag a) is iron blast furnace slag.

18. A particulate binder according to claim 14, comprising, in weight %, to a total of 100%:

i) 75 to 90% iron blast furnace slag; and ii) 10 to 20% cement kiln dust.

19. A particulate binder according to claim 14, comprising, in weight %, to a total of 100%:

i) 75 to 90% iron blast furnace slag;

ii) 10 to 20% cement kiln dust; and iii) 10 to 20% lime kiln dust.

* * * * *